United States Patent [19]

Sousa

[11] Patent Number: 4,702,031
[45] Date of Patent: Oct. 27, 1987

[54] BITE INDICATOR FOR FISHING GEAR

[76] Inventor: David W. Sousa, 41903 Corte Santa Barbara, Fremont, Calif. 94539

[21] Appl. No.: 878,428

[22] Filed: Jun. 25, 1986

[51] Int. Cl.[4] .............................................. A01K 97/12
[52] U.S. Cl. ........................................... 43/17; 43/24
[58] Field of Search ................................. 43/7, 24, 25

[56] References Cited

U.S. PATENT DOCUMENTS

| | | | |
|---|---|---|---|
| 2,893,158 | 7/1959 | Haber | 43/24 |
| 4,125,957 | 11/1978 | Cunningham | 43/17 |
| 4,236,340 | 12/1980 | Cunninghm | 43/17 |
| 4,552,318 | 11/1985 | Durham | 43/17 |

*Primary Examiner*—Gene P. Crosby
*Attorney, Agent, or Firm*—Robert Charles Hill

[57] ABSTRACT

A method and apparatus for providing a visual bite indication comprise a weighted mass having an opening through which a fishing line is loosely threaded so that the weighted mass is suspended upon the line and causes the line to sag when the line is extended for fishing so that tension produced in the line by a bite causes the weighted mass to move as a visual bite indicator. The weighted mass is adapted for being secured to an adjacent eyelet during casting to prevent the weighted mass from interfering with forward passage of the line from the reel. Preferably, the weighted mass and one eyelet are magnetically attractive to each other, the one eyelet either being a fixed portion or adapted for attachment to a pre-existing rod. Multiple embodiments of the adjacent eyelet are disclosed.

21 Claims, 9 Drawing Figures

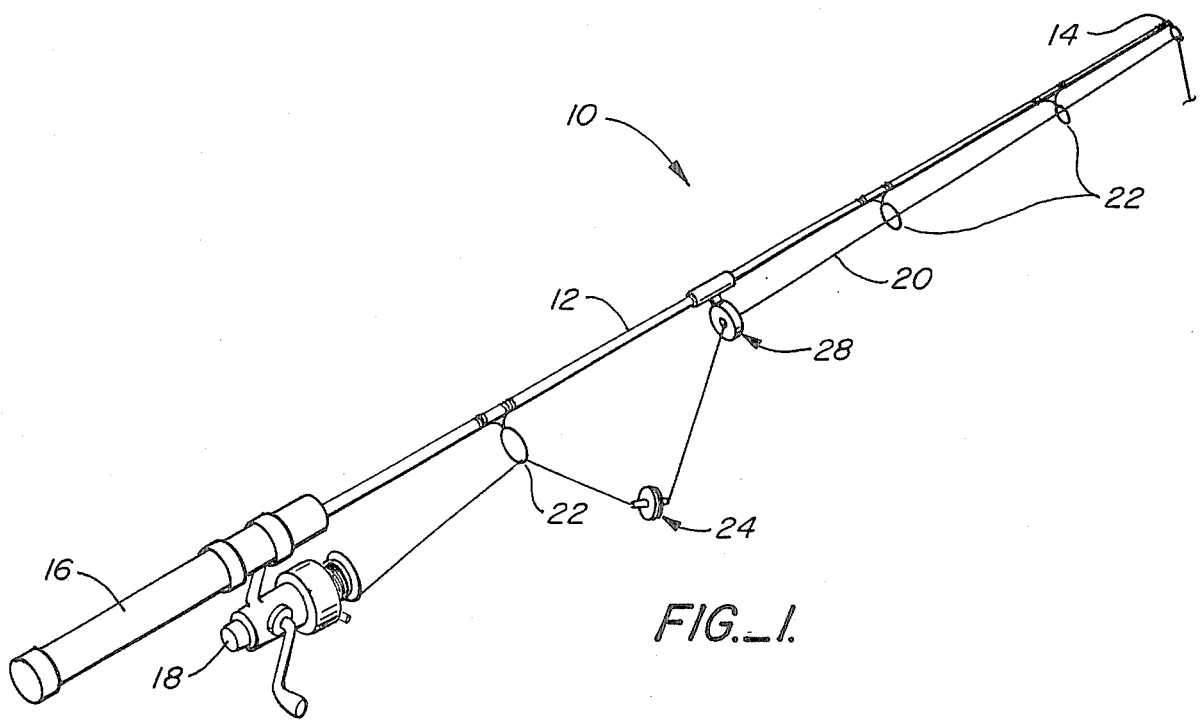
FIG._1.
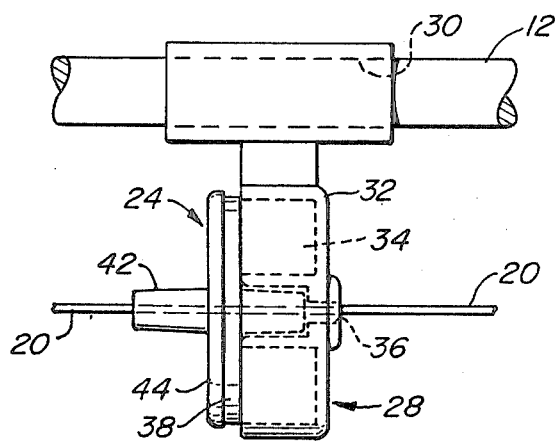
FIG._2.
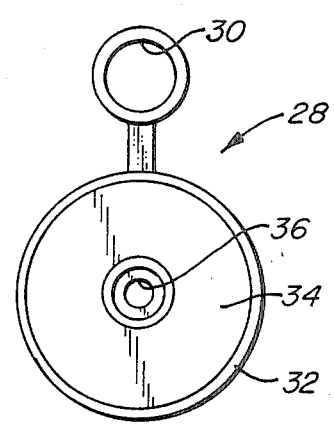
FIG._3.
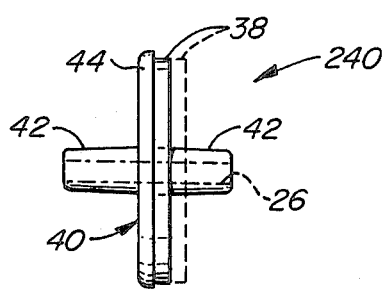
FIG._4.
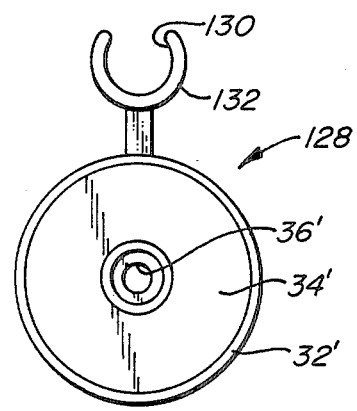
FIG._5.

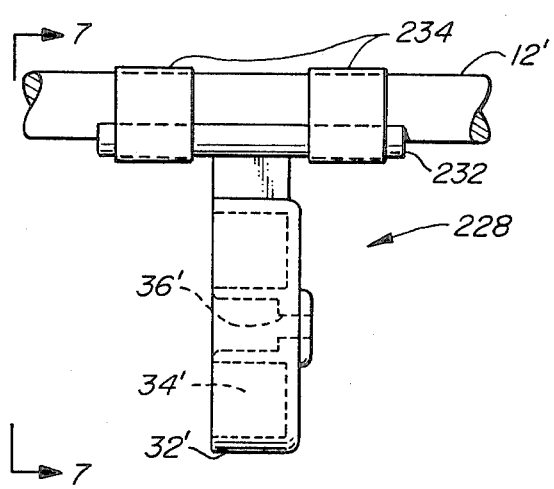
FIG._6.
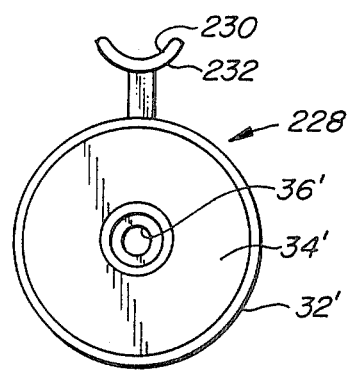
FIG._7.
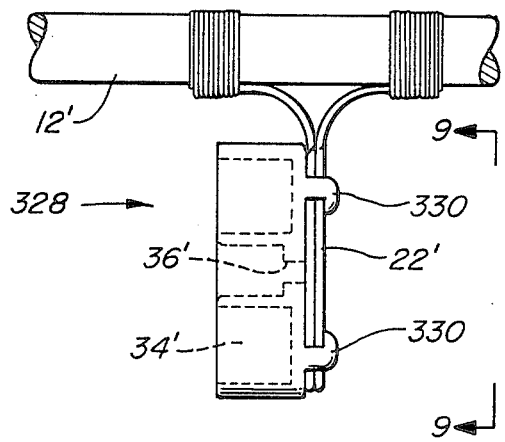
FIG._8.
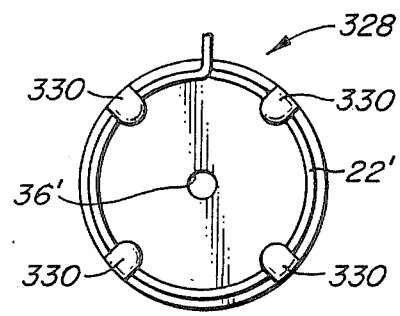
FIG._9.

BITE INDICATOR FOR FISHING GEAR

FIELD OF THE INVENTION

The present invention relates to a method and apparatus for providing a visual bite indication with otherwise conventional fishing gear.

BACKGROUND OF THE INVENTION

The bite indicator method and apparatus of the invention are adapted for use with otherwise conventional fishing gear including a rod, a reel mounted on a rearward portion of the rod and fishing line extending forwardly from the reel through at least one eyelet. Generally, it is contemplated that the method and apparatus will be used with fishing gear including a number of such eyelets mounted on the rod for guiding the fishing line from the reel toward the opposite tip of the rod so that the fishing line can extend outwardly from the rod in conventional fashion for fishing.

Fishing gear of the type summarized above is of course well known in the prior art. The preceding description of the fishing gear is not intended to limit the invention but merely to be illustrative of fishing gear with which the method and apparatus of the invention can be used.

The prior art has also provided numerous bite indicating combinations which commonly respond to increased tension or a pull on the fishing line caused by a bite or preferably even by a nibble. However, these prior art bite indicators have been relatively complex, often including electronic mechanisms and the like for detecting increased tension in the fishing line and for providing a visual, audible or otherwise detectable signal by the person using the fishing gear.

Accordingly, there has been found to remain a need for an improved method and apparatus for providing a visual bite indication with fishing gear of the type described above.

SUMMARY OF THE INVENTION

It is therefore an object of the invention to provide an improved method and apparatus for providing a simple visual indication of a bite while using fishing gear.

It is a further object of the invention to provide such a method and apparatus wherein a weighted mass is loosely threaded onto the fishing line whereby the weighted mass is suspended upon the line and causes the line to sag when extended for fishing so that tension produced in the line by a nibble or bite causes the weighted mass to either jiggle or move up and down as a visual bite indication. At the same time, the weighted mass comprises means securable to an adjacent eyelet through which the fishing line passes. In this manner, the weighted mass can be immobilized relative to the rod during casting to prevent it from interfering with forward passage of the fishing line from the reel.

It is a further object of the invention to provide such a method and apparatus wherein the weighted mass and the one adjacent eyelet are formed at least partially from magnetically attractive materials. Preferably, the weighted mass is arranged upon the fishing line between the one eyelet and a second eyelet both arranged forwardly of the reel.

It is an even further object of the invention to provide such a method and apparatus wherein the one eyelet is formed either as an integral portion of the fishing gear or including means for attachment to a pre-existing rod.

Different embodiments of the one eyelet comprise different means for securing the eyelet upon the tapered rod.

Additional objects and advantages of the invention will be apparent from the following description having reference to the accompanying drawing.

BRIEF DESCRIPTION OF THE DRAWING

FIG. 1 is a perspective view of the bite indicator means of the present invention arranged upon otherwise generally conventional fishing gear. At the same time, FIG. 1 is illustrative of apparatus suitable for carrying out the method of providing a visual bite indication according to the invention.

FIG. 2 is an enlarged fragmentary view of a portion of the fishing rod and fishing line of FIG. 1 while illustrating in better detail a weighted mass and adjacent eyelet forming the bite indicator combination of the invention.

FIG. 3 is an end view of the eyelet alone taken from the left side of FIG. 2.

FIG. 4 is a further enlarged view of the weighted mass.

FIG. 5 is an end view of another snap-on embodiment of an eyelet otherwise having the same configuration illustrated in FIG. 2.

FIGS. 6 and 7 are respectively a side view and end view of another embodiment of an eyelet, the eyelet being tapered onto a fragmentary portion of a rod in FIG. 6.

FIGS. 8 and 9 are also respectively a side view and end view of still another embodiment of an eyelet, the eyelet being secured to an existing eyelet on a fragmentary portion of a rod in FIG. 8.

DESCRIPTION OF THE PREFERRED EMBODIMENT

Referring now to the drawing and particularly to FIG. 1, the method and apparatus of the present invention are contemplated for providing a visual bite indication when used with conventional fishing gear as is generally indicated at 10 in FIG. 1. The fishing gear 10 includes a pole or rod 12 having a tip 14 formed at one end and an enlarged grip 16 formed at the other end. The rod 12 may be hand held by the grip 16 or mounted in a conventional holding bracket (not shown).

In any event, the fishing gear also includes a reel 18 attached to a rearward portion of the rod 12, preferably upon the grip 16. A fishing line 20 extends forwardly from the reel 18 and is threaded through eyelets such as those indicated at 22 which are affixed to the rod 12. In this manner, the fishing line 20 extends beyond the tip 14 for attachment to a fishing lure or hook means (not shown). However, in the above combination, it is important to understand that during use of the fishing gear, when a fish bites or even nibbles on the lure or baited hook, increased tension is experienced along the length of the fishing line 20.

In its broadest aspect, the present invention employs a weighted mass 24 which is formed with an opening 26 (FIG. 4) through which the fishing line 20 is loosely threaded. With the weighted mass being suspended upon the fishing line 20, it tends to cause the line to sag when the line is extended for fishing as illustrated in FIG. 1. At the same time, if a bite causes substantial variation intension along the length of the fishing line 20, the resulting effect upon the weighted mass causes it to move up and down relative to the pole as a visual bite indication. Even in the case of a nibble, some movement or jiggling of the mass 24 will result in a similar visual indication.

The weighted mass comprises means securable to the rod 12, preferably through an adjacent eyelet 28 so that the weighted mass can be immobilized relative to the pole during casting to prevent the weighted mass from interfering with forward passage of the fishing line 20 from the reel 18.

The one eyelet 28 adjacent the weighted mass can either be formed as an integral or fixed portion of the rod 12 or it can include means for attachment to a preexisting rod as described in greater detail below with reference to FIGS. 2–4.

Referring now to FIG. 2, the eyelet 28 is preferably adapted for use with a tapered rod as illustated for the rod 12 in FIG. 2. For that purpose, the eyelet 28 is formed with a bore 30 permitting the eyelet to slide into a firmly engaged position on the rod 12 as best seen in FIG. 2. Referring also to FIG. 1, the one eyelet 28 is preferably positioned on the rod 12 along with at least one other eyelet 22 forwardly of the reel 18.

Preferred construction of the weighted mass and mating portion of the one eyelet 28 is best illustrated in combination by FIGS. 2 and 4. As illustrated in those figures, the weighted mass 24 and one eyelet 28 are at least partially formed from materials which are magnetically attractive to each other. As illustrated in FIGS. 2 and 3, the one eyelet 28 has a plastic body 32 with an annular magnet 34 surrounding an opening 36 extending entirely through the body 32.

The weighted mass 24 includes a metal member or washer 38 mounted on a plastic body 40 including a balancer tube 42 and integral disc 44 for positioning the washer.

In addition, the weighted mass and one eyelet are formed with mating parts which also assist in immobilizing the weighted mass upon the eyelet 28 for example during casting. For that purpose, the balancer tube 42 is shaped for snuggly fitting within the opening 46. As may be seen in FIG. 1, the elongated balancer tube 42 tends to rest in a level plane on the line 20 and thus prevents the weighted mass from tipping to make it more visible before a bite or nibble occurs.

It will of course be apparent that the magnetically attractive materials of the weighted mass and eyelet can serve to immobilize the weighted mass upon the eyelet during casting. Also, the weighted mass could include a magnet with the eyelet including at least a metallic portion (not shown) which would be attracted to the magnet. However, such a reverse combination is believed obvious and is accordingly not illustrated in the patent figures.

The method of operation for the bite indicator assembly of the present invention is believed clearly apparent from the figures and from the preceding description. However, the method of operation is briefly described below in order to assure a complete understanding of the invention.

Referring particularly to FIG. 1, the weighted mass 24 is maintained in a vertical position on the fishing line 20 by the balancer tube 42 and positioned adjacent the eyelet 28 and preferably between the eyelet 28 and an additional eyelet 22 both mounted on the rod 12 forwardly of the reel 18. During casting, the weighted mass 24 is immobilized relative to the rod 12 by securing it to the one eyelet 28 as illustrated in FIG. 2. With the weighted mass immobilized in that position, the fishing line 20 is free to pass in generally linear fashion from the reel 18 forwardly through the other eyelet 22 and through the opening 26 in the weighted mass to permit conventional casting with the fishing gear 10.

Once the fishing line 20 is fully extended from the rod, the weighted mass 24 is separated from the one eyelet 28 and suspended upon the fishing line as illustrated in FIG. 1. With the weighted mass 24 in that position, it tends to cause the fishing line 20 to sag with the line extended so that tension produced in the line 20 by a bite causes the weighted mass to move up and down as a visual bite indication. Similarly, even a nibble would cause the mass to oscillate or jiggle on the line 20 to serve as a visual indication. Thus, the fishing gear can be operated in generally conventional fashion for landing or catching the fish or for setting the hook in response to a nibble.

Operation of the reel 18 to land the fish can be further enhanced by moving the weighted mass 24 into engagement with the eyelet 28 while reeling in the fishing line 22. Possible interference of the weighted mass with the fishing line could similarly be avoided while reeling in the fishing line by positioning an eyelet similar to that illustrated at 28 directly intermediate the weighted mass and the reel. Interference could thus be avoided so that the weighted mass would be immobilized thereupon while reeling in the fishing line. Here again, such a combination is believed obvious and accordingly is not illustrated in the drawing.

Additional embodiments or variations of the eyelet 28 are illustrated respectively in FIG. 5 at 128, in FIGS. 6 and 7 at 228 and in FIGS. 8 and 9 at 328. Components of the eyelet and other portions of the fishing gear illustrated in those drawings which are generally similar as components described above in FIGS 1–4 are indicated by similar primed numerals.

Referring particularly to FIG. 5, an opening 130 (corresponding to the opening 30 in FIGS. 2 and 3) is formed by a tubular portion 132 adapted to be snapped into place onto a fishing rod such as that indicated in FIGS. 1 and 2 in order to secure the eyelet 128 upon the rod in a generally similar manner as illustrated for the eyelet 28 in FIG. 2. Otherwise, construction of the eyelet 128 is generally similar to that described above for the eyelet 28.

Still another embodiment of an eyelet is indicated at 228 in FIGS. 6 and 7 wherein an opening or mounting surface 230 is formed by an elongated element 232 which is adapted to be held in place against a fishing rod as indicated at 12' in FIG. 6 by external means such as tape indicted at 234. Hereagain, the eyelet 228 is otherwise of generally similar construction as the eyelet 28 illustrated in FIGS. 2 and 3.

Still another embodiment of an eyelet constructed according to the present invention is indicated at 328 in FIGS. 8 and 9. In this embodiment, the eyelet 328 is adapted to be snapped into place over an existing eyelet such as that indicated at 22' on the fishing rod 12' in FIG. 8. The eyelet 22' may be of similar construction as the eyelets indicted at 22 in FIG. 1. The eyelet 328 includes hook portions 330 similarly formed from plastic or other resilient material about the periphery of the eyelet 328. The hook portions 330 are further configured so that the eyelet 328 can can be snapped into place on the existing eyelet 22' in the manner illustrated in FIG. 8 and 9.

Numerous modifications and variations are believed apparent in addition to those summarized or set forth above. Accordingly, the scope of the present invention is defined only by the following appended claims.

What is claimed is:

1. A bite indicator for fishing gear including a rod, reel means mounted on a rearward portion of the rod and fishing line extending forwardly from the reel through at least one eyelet affixed to said rod, the bite indicator comprising a weighted mass having a balancer tube and an opening through which the fishing line is loosely threaded, the weighted mass being arranged adjacent the one eyelet whereby the weighted mass is suspended upon the line and causes the line to sag when extended for fishing so that tension produced in the line by a bite causes the weighted mass to move as a visual bite indicator, the balancer tube and weighted mass comprising means securable to the one eyelet during casting to avoid interfering with forward passage of the line from the reel.

2. The bite indicator of claim 1 wherein the weighted mass and the one eyelet include magnetically attractive materials for securing the weighted mass in place upon the one eyelet.

3. The bite indicator of claim 1 wherein the weighted mass is arranged on the fishing line between the one eyelet and a second eyelet both arranged on the rod forwardly of the reel.

4. The bite indicator of claim 3 wherein the weighted mass is arranged forwardly of the second eyelet and rearwardly of the one eyelet.

5. The bite indicator of claim 3 wherein the one eyelet forms an enlarged opening and the weighted mass forms a tapered nose sized to fit into the enlarged opening of the one eyelet.

6. The bite indicator of claim 5 wherein the weighted mass and the one eyelet include magnetically attractive materials for securing the weighted mass in place upon the one eyelet.

7. The bite indicator of claim 1 wherein the one eyelet forms an enlarged opening and the weighted mass forms a tapered nose sized to fit into the enlarged opening of the one eyelet.

8. A bite indicator assembly for use with fishing gear including a rod, reel means mounted on a rearward portion of the rod and fishing line extending forwardly from the reel, the bite indicator assembly comprising a weighted mass having an opening through which the fishing line can be threaded and one eyelet including means for attachment to the rod adjacent the weighted mass whereby the weighted mass is suspended upon the line and causes the line to sag when the line is extended for fishing so that tension produced in the line by a bite causes the weighted mass to move up and down as a visual bite indicator, the weighted mass and the one eyelet comprising means securable to each other during casting to prevent the weighted mass from interfering with forward passage of the fishing line from the reel, the bite indicator being adapted for use with a tapered rod, wherein the attachment means for the one eyelet comprises a bore for sliding into a firmly engaged position on the rod.

9. The bite indicator assembly of claim 8 wherein the weighted mass and the one eyelet include magnetically attractive materials for securing the weighted mass in place upon the one eyelet.

10. The bite indicator assembly of claim 8 wherein the weighted mass is arranged on the fishing line between the one eyelet and a second eyelet both arranged on the rod forwardly of the reel.

11. The bite indicator assembly of claim 10 wherein the weighted mass is arranged forwardly of the second eyelet and rearwardly of the one eyelet.

12. The bite indicator of claim 8 wherein the weighted mass further comprises balancer means for orienting the weighted mass on the fishing line.

13. The bite indicator assembly of claim 10 wherein the one eyelet forms an enlarged opening and the weighted mass forms a tapered nose sized to fit into the enlarged opening of the one eyelet.

14. The bite indicator assembly of claim 8 wherein the one eyelet forms an enlarged opening and the weighted mass forms a tapered nose sized to fit into the enlarged opening of the one eyelet.

15. The bite indicator assembly of claim 8 wherein the one eyelet includes means for attaching the one eyelet to a pre-existing rod.

16. In a method for employing a bite indicator on fishing gear including a rod, reel means mounted on a rearward portion of the rod and fishing line extending forwardly from the reel through at least one eyelet affixed to said rod, the steps comprising forming a weighted mass to have a balancer tube and an opening through which the line can be loosely threaded and arranging the weighted mass on the fishing line adjacent the one eyelet whereby the weighted mass is suspended upon the line and causes the line to sag when extended for fishing so that tension produced in the line by a bite causes the weighted mass to move up and down as a visual bite indicator, and using the balancer tube and weighted mass securable to the one eyelet during casting to prevent the weighted mass from interfering with forward passage of the line from the reel.

17. The method of claim 16 wherein the weighted mass and the one eyelet are attachments for use with existing fishing gear.

18. The method of claim 17 adapted for use with a tapered rod and further comprising the step of forming an attachment means for the one eyelet as a tapered bore for sliding into a firmly engaged positon on the rod.

19. The method of claim 16 wherein the weighted mass and the one eyelet are formed at least partially from materials which are magnetically attractive to each other.

20. The method of claim 16 wherein the weighted mass is arranged on the fishing line between the one eyelet and a second eyelet both arranged on the rod forwardly of the reel.

21. The method of claim 19 wherein the one eyelet forms an enlarged opening and the weighted mass forms a tapered nose sized to fit into the enlarged opening of the one eyelet.

* * * * *